United States Patent [19]

Sawyer

[11] Patent Number: 5,516,250
[45] Date of Patent: May 14, 1996

[54] TREE FELLING ATTACHMENT APPARATUS FOR TRACTORS

[76] Inventor: Gary D. Sawyer, Rte. 1, Box 1948, Bryan, Tex. 77803

[21] Appl. No.: 292,525

[22] Filed: Aug. 18, 1994

[51] Int. Cl.⁶ .................................................. A01G 23/06
[52] U.S. Cl. .......................... 414/23; 144/34.2; 414/920
[58] Field of Search ........................... 414/23, 731, 740, 414/920; 144/34 A, 34 R

[56] References Cited

U.S. PATENT DOCUMENTS

| | | | |
|---|---|---|---|
| 2,505,923 | 5/1950 | Taylor et al. | 37/2 |
| 2,535,099 | 12/1950 | Slick | 254/132 |
| 2,650,063 | 8/1953 | Hawkins | 254/132 |
| 3,057,599 | 10/1962 | Clatterbuck | 254/132 |
| 3,163,458 | 12/1964 | Brandt, Jr. | 414/740 X |
| 3,528,467 | 9/1970 | Watsabaugh | 144/34 |
| 3,643,920 | 2/1972 | Widegren et al. | 254/124 |
| 3,747,651 | 7/1973 | Bangert et al. | 144/34 R X |
| 3,823,916 | 7/1974 | Shaw | 414/23 X |
| 3,974,925 | 8/1976 | McKenzie | 414/23 |
| 5,180,142 | 1/1993 | Nowlin | 254/132 |

*Primary Examiner*—Frank E. Werner
*Assistant Examiner*—Janice L. Krizek
*Attorney, Agent, or Firm*—Daniel Rubin

[57] ABSTRACT

A tree felling attachment apparatus for a farm tractor having connections for rear mounting the attachment onto the hydraulic lift arms and stabilizer bar of the tractor. The attachment includes an elongated longitudinal beam extending rearward behind the tractor that terminates at its distal end in a gripper operable between open and closed positions to receive and grip a tree trunk to be felled. In response to rearward driving of the tractor, the gripper effects felling of the tree disposed therein while enabling the tractor to remove the felled tree to a suitable disposal site.

8 Claims, 3 Drawing Sheets

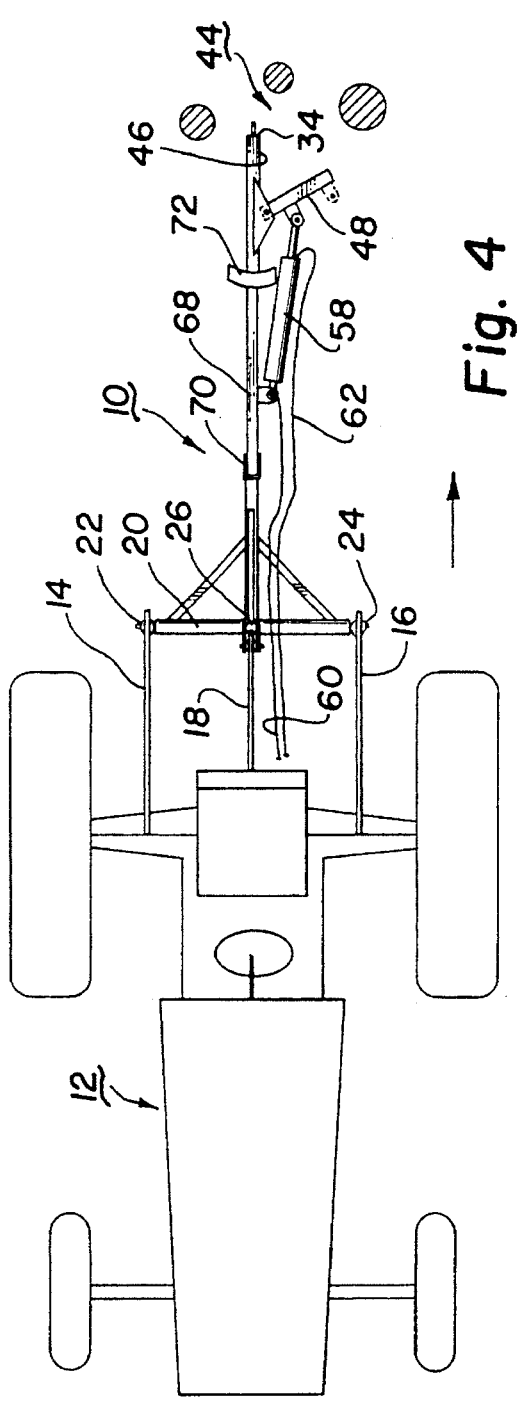
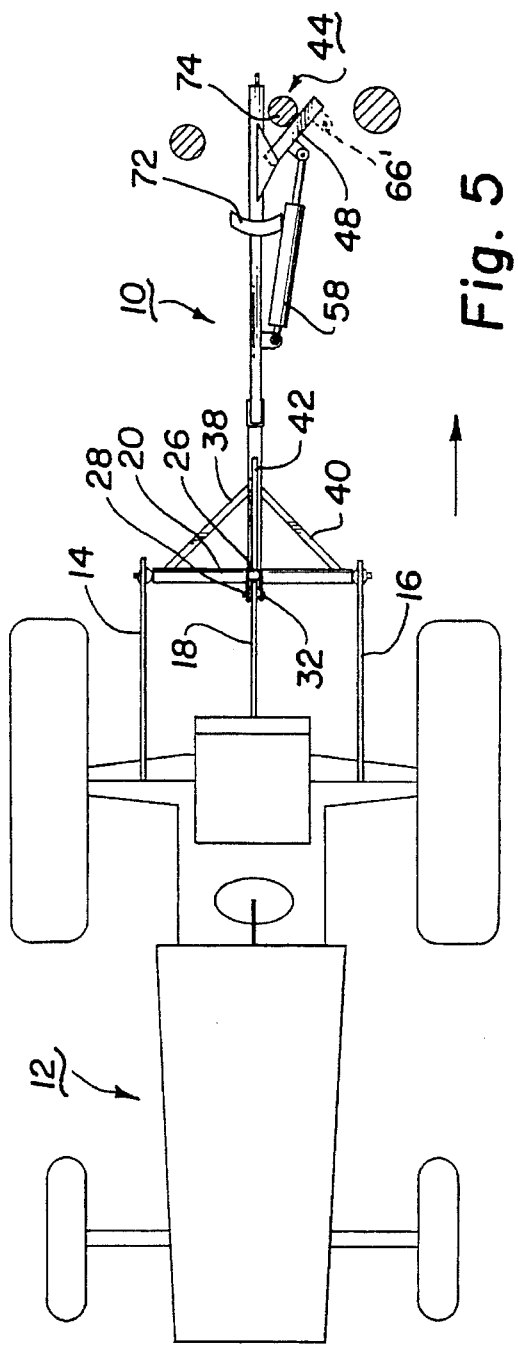

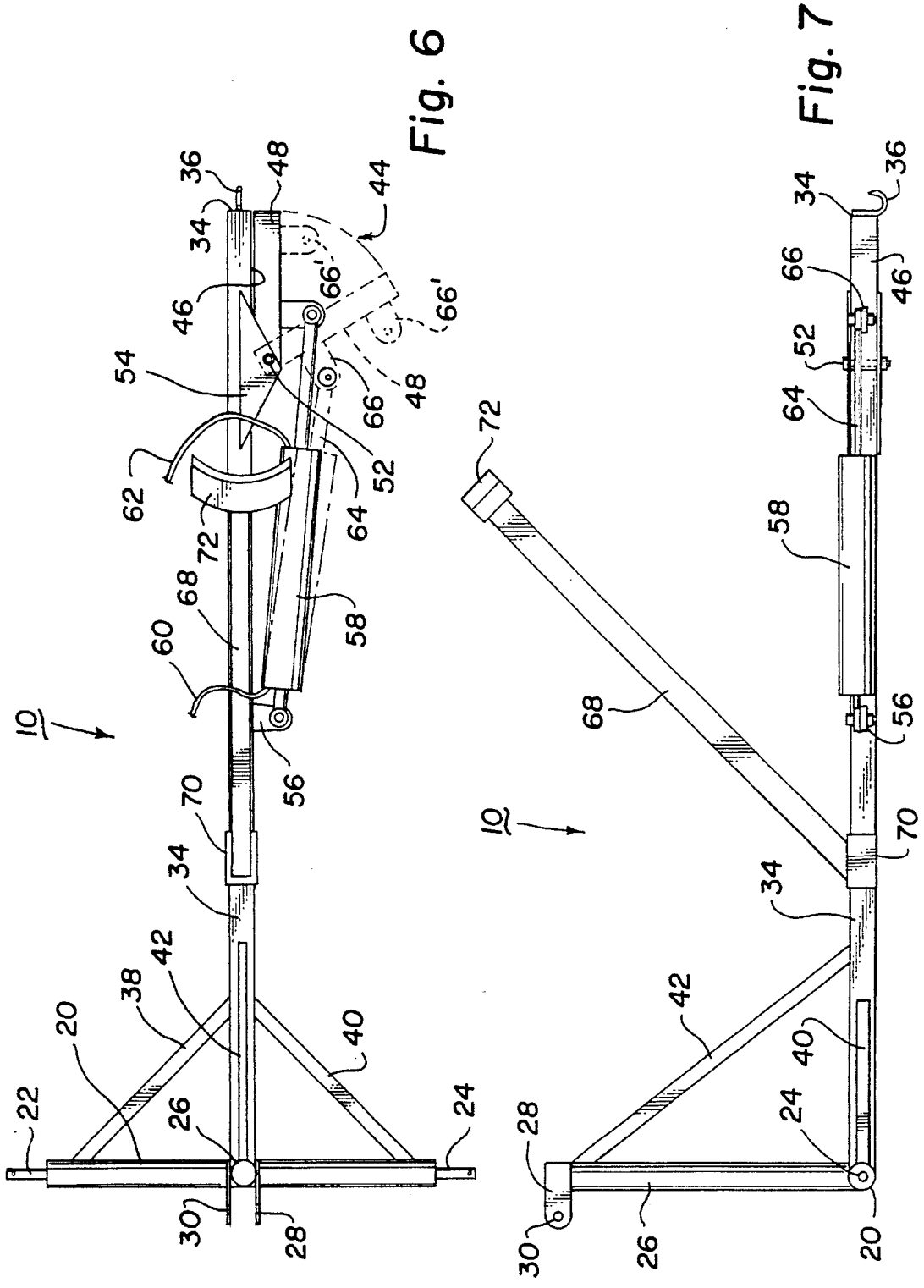

TREE FELLING ATTACHMENT APPARATUS FOR TRACTORS

FIELD OF THE INVENTION

The field of art to which the invention relates comprises the art of tractor attachments useful in the felling and disposal of trees, ground posts, etc.

1. Background of the Invention

It is a common practice when effecting land clearance to first remove trees and/or other post items standing in the clearance site. When the trees are very large and/or extremely tall, they are typically cut to stump level after which the remaining stump is removed by blasting or the like. For trees of smaller diameter, removal is typically achieved by bulldozing or otherwise uprooting the trees that are subsequently removed by other equipment for disposal elsewhere.

2. Background of the Prior Art

Various known apparatus for the removal of trees or other forms of ground posts, include bulldozers, tractors, front end loaders, etc. Exemplifying such apparatus are the disclosures of U.S. Pat. Nos. 2,505,923; 2,535,099; 2,650,063; 3,057,599; 3,528,467; 3,643,920; 3,974,925; and 5,180,142.

While such known apparatus undoubtedly function well, they are generally characterized as heavy, bulky, expensive, currently obsolete and/or lacking in the capability of tractor mounting while being unable to both uproot and remove a tree to a suitable disposal site.

OBJECTS OF THE INVENTION

It is therefore an object of the invention to provide a novel apparatus for tractor mounting enabling both the uprooting and subsequent removal of trees and/or ground posts, etc.

It is a further object of the invention to effect the previous object with an apparatus operable with rearward motion of a tractor on which the apparatus is mounted yet able to minimize if not eliminate the possibility of the uprooted tree falling on the operator of the tractor.

It is a still further object of the invention to effect the previous objects with apparatus comprised of a relatively inexpensive and uncomplicated arrangement of components.

SUMMARY OF THE INVENTION

This invention relates to a novel tree falling apparatus adapted for tractor mounting. More specifically, the invention relates to such apparatus operable when rear mounted on a tractor to both uproot trees and/or ground post items and subsequently remove them to a suitable disposal site.

The foregoing is achieved in accordance with the apparatus of the invention when mounted on the rear end of a tractor that includes a linkup having a pair of parallel lift arms and a central stabilizing bar for affecting a three point lift. The attachment includes a crossbar to be received transversely between the lift arms substantially parallel with the rear axle of the tractor while at a central location intermediate its ends, the cross bar is connected via vertical bracing to the tractor's top link stabilizer bar.

Extending rearward from a connection with the cross bar is a cantilevered center frame in a form of an elongated beam which at its distal end includes a horizontally oriented hydraulically operable gripper. A hydraulic cylinder on the beam is operable from hoses and controls provided on the tractor whereby when actuated, can controllably open or close the gripper jaws at will. Embracing a tree disposed in the gripper enables rearward motion of the tractor to fell the tree which while still being held in the gripper can promptly be transported elsewhere for suitable disposal. The above is simple, yet represents a relatively inexpensive construction that is highly effective in enabling a tree-at-a-time to be removed.

The above noted feature and advantages of the invention as well as other superior aspects hereof will be further appreciated by those skilled in the art upon reading the detailed description which follows in conjunction with the drawings.

BRIEF DESCRIPTION OF THE DRAWINGS

FIGS. 4 and 5 are plan views of the attachment apparatus hereof illustrating jaw operation in the open and gripping relations respectively;

FIG. 6 is an enlarged plan view of the apparatus hereof; and

FIG. 7 is an enlarged side view of the apparatus hereof.

DESCRIPTION OF THE PREFERRED EMBODIMENT

Figure 1:
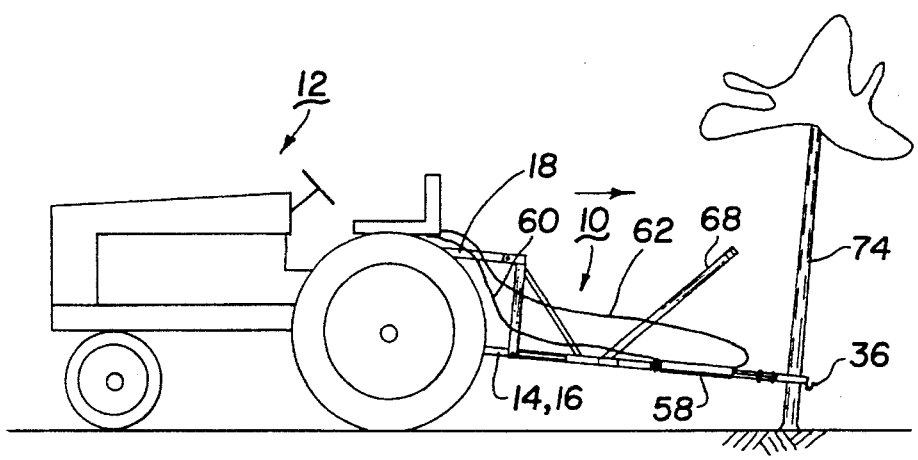
FIGS. 1, 2, and 3 are side elevations of the tractor mounted apparatus hereof illustrating a sequence of steps in felling of a tree.

In the description which follows, like parts are marked throughout the specification and drawings with the same reference numerals respectively. The drawing figures are not necessarily to scale and the proportions of certain parts may have been exaggerated for purposes of clarity.

Referring now to the drawings, the attachment apparatus hereof is designated 10 for mounting to the rear of a conventional and commercially available form of farm tractor 12. The tractor would typically be driven with a 30–50 horsepower engine and includes controls and connectors (not shown) for receipt of hydraulic hoses for purposes to be described. Also forming part of the tractor are opposite and parallel lift arms 14 and 16 and a top link stabilizer bar 18.

Comprising the attachment apparatus of the invention hereof is a transverse crossbar 20 having doweled ends 22 and 24 for secured mounting into the lift arms 14 and 16 respectively. Secured centrally upright to the cross bar is a vertical brace 26, which via a lateral clevis 28, is secured at its upper end to stabilizer bar 18 by bolt 32 in aperture 30.

Connected to and horizontally extending away from the cross bar at the lower connection of brace 26 is a horizontal beam 34 formed of elongated pipe or the like for a length of about six feet to a distal end 34 at which there is disposed a hook 36. Securing the beam in this relation, via welding or the like, are angled side braces 38 and 40 and vertically angled brace 42. Formed at the distal end 34 is a horizontally operable gripper 44, one jaw of which is comprised of the stationary side face 46 of the beam end 34 thereat while a relatively movable jaw 48 is pivotally supported via pin 52 in a guide and brace 54 welded to the beam.

For displacing jaw 48 there is provided a hydraulic cylinder 58 supported on lateral side lug 56 and to which hoses 60 and 62 are connected from the hydraulic connection at the tractor. The piston end 64 of the cylinder is in turn connected to a lateral side lug 66 (or optionally lug 66') on the side face of pivotal jaw 48. By causing the piston 64 to extend and retract, gripper jaw 48 will be displaced toward a closed or open position respectively. A vertical rearwardly angled safety bar 68 of about 2–3 feet in height is secured welded to the beam at block 70 and terminates at its upward end via an arcuate span 72. This serves to intercept a forward falling tree and protect an operator in the tractor seat as will be understood.

Mounting the apparatus 10 to tractor 12, represents the height of simplicity in that it is only necessary to connect cross bar 20 between lift arms 14 and 16, connect brace 26 via clevis 28 to the upper stabilizer beam 18 and connect hydraulic hoses 60 and 62 between cylinder 58 and the tractor. With the hook-up completed, and gripper 44 in the open relation seen in FIG. 4, a tree 74 to be felled is approached with a backward reverse motion of tractor 12. On the tree being received within the gripper, jaw 48 is caused to move from its open toward its closed relation by operation of hydraulic cylinder 58 so as to effect a grip on the tree trunk before felling is undertaken as seen in FIG. 5.

Figure 2:
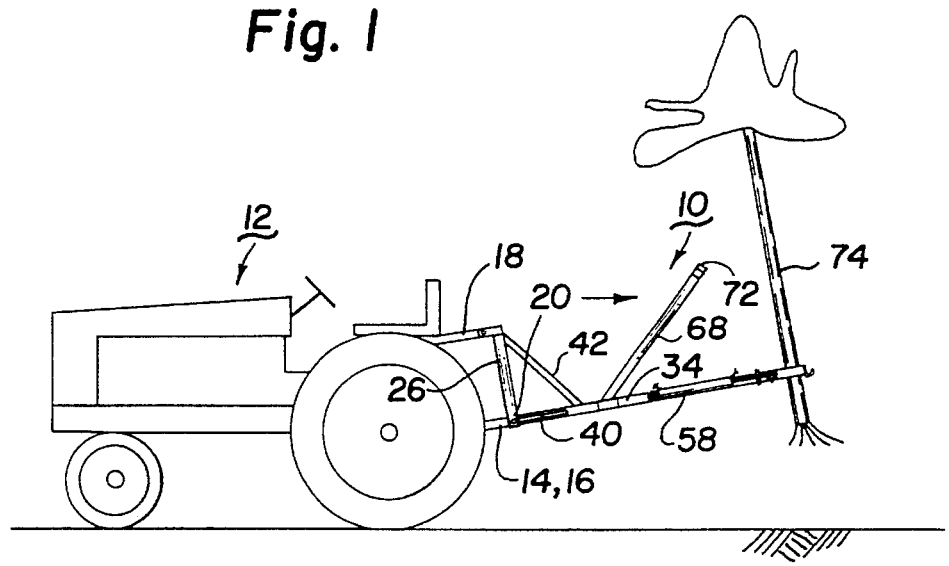
Figure 3:
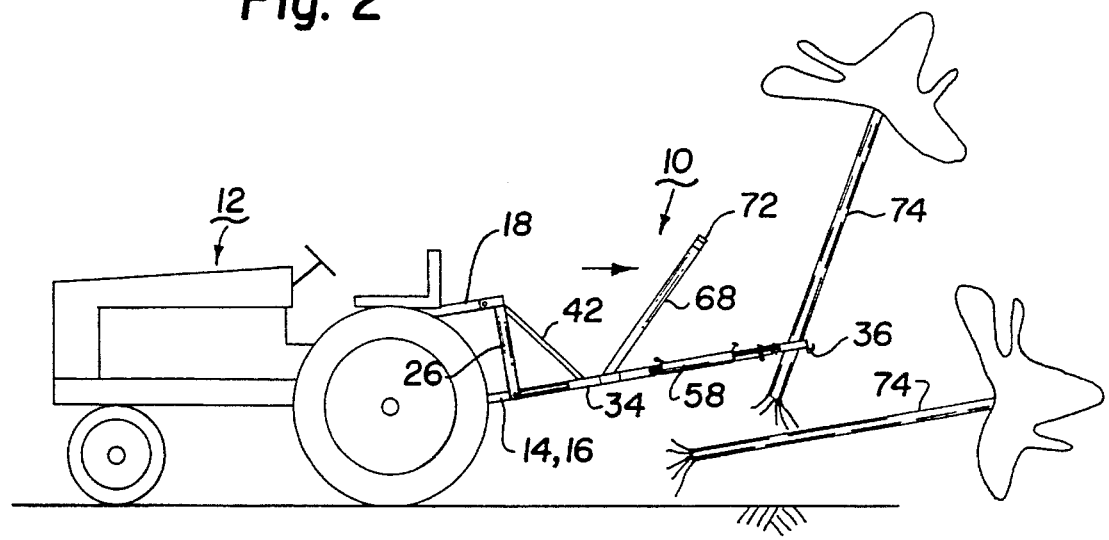

By then operating the tractor in reverse so as to apply a rearward force against the tree, the tractor tends to tip backwards (as best seen in FIG. 1) effecting an increase in traction on the rear wheels while causing the tree to be gradually uprooted. When sufficiently uprooted, the attachment, with tree in hold, is caused to be raised via operation of the lift arms and stabilizer bar until the tree is completely removed from the ground as best seen in FIG. 2. Thereafter, the tree may be laid down and released by opening gripper 44 and/or while still in the grip of gripper 44 driven elsewhere for disposal. Should the felled tree be inclined toward falling forward as illustrated in FIG. 2, it is encountered and intercepted by the arcuate span end 72 of safety bar 68 whereby it is prevented from falling further toward the tractor.

By the above description there is disclosed a novel tractor attachment for the felling of trees and the disposal thereof. The attachment is adapted for ready and easy mounting onto the back end of a farm tractor. It enables simple felling of trees of up to about eight inches in diameter and twenty feet tall. With a backward reverse motion of the tractor a grip of the tree is first effected via a movable jaw at the end of an elongated beam. Since the length of beam 34 is at least six feet, in combination with a safety bar 68, the possibility of the tractor seat being struck by a falling tree is substantially if not completely prevented. With the attachment hereof being relatively simple in construction and relatively uncostly to fabricate, it becomes readily affordable by those who utilize tractors in and about a land site. While the primary emphasis of the invention has been directed toward the felling of trees, it will be appreciated that the attachment hereof is useful for removal of any post-like item in and about a clearance site.

since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A unitary ground clearing felling apparatus attachable to and detachable from a tractor having hydraulically operable spaced apart and vertically movable lift arms supported at the rear of said tractor and a stabilizer bar centrally located between said lift arms, and controls on said tractor for operating said lift arms, said attachment apparatus being adapted for operative mounting as a unit onto the lift arms and stabilizer bar of said tractor and comprising:

a generally horizontal elongated beam longitudinally extending rectilinearly between a first end and a second end and aligned substantially in the vertical plane of said stabilizer bar;

said first end including mounting means for effecting a mounting connection with said lift arms and said stabilizer bar of the tractor to which said beam is to be attached;

said second end including a gripper operable between an open position and a closed position, said second end being responsive within a tree or post-like item disposed in said gripper and said tractor being operated in a rearward motion to effect felling of the tree or post-like item disposed in said gripper.

2. A felling attachment apparatus in accordance with claim 1 in which said gripper is operative to grip the tree trunk or post-like item disposed therein and said attachment can be operative to raise the felled item after felling for tractor removal from the clearance site.

3. A felling attachment apparatus in accordance with claim 2 in which there is included a hydraulic cylinder for actuating said gripper between positions and operative from said tractor.

4. A tree felling attachment apparatus in accordance with claim 3 in which said tractor provides said attachment with a three point lift and said mounting means includes bracing about the first end of said beam affording rigidity of said mounting connection to the tractor.

5. A felling attachment apparatus in accordance with claim 4 in which said mounting means on the first end of said beam includes a cross-bar adapted to be transversely connected between said lift arms and a vertical brace upstanding from said cross bar and adapted for connection at its upper end to said stabilizer bar.

6. A felling attachment apparatus in accordance with claim 5 including a safety bar secured to said beam intermediate said beam ends and extending rearwardly upward to a height sufficient to intercept a felled tree against falling on said tractor.

7. A felling attachment apparatus in accordance with claim 6 in which the uppermost end of said safety bar includes an arcuate span against which the trunk of a forward falling tree is adapted to be intercepted.

8. A felling attachment apparatus in accordance with claim 7 in which there is included a vertically oriented hook on the distal face of said second beam end.

\* \* \* \* \*